United States Patent
Argue et al.

(10) Patent No.: US 9,589,288 B2
(45) Date of Patent: Mar. 7, 2017

(54) TRACKING EFFECTIVENESS OF REMOTE SALES ASSISTANCE USING AUGMENTED REALITY DEVICE

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 767 days.

(21) Appl. No.: 13/769,160

(22) Filed: Feb. 15, 2013

(65) Prior Publication Data
US 2014/0236764 A1    Aug. 21, 2014

(51) Int. Cl.
G06Q 30/00    (2012.01)
G06Q 30/06    (2012.01)

(52) U.S. Cl.
CPC ..... G06Q 30/0613 (2013.01); G06Q 30/0641 (2013.01); *G06Q 30/0623* (2013.01)

(58) Field of Classification Search
CPC .... G06Q 30/06–30/0645; G06Q 30/08; G06Q 50/01
See application file for complete search history.

(56) References Cited

U.S. PATENT DOCUMENTS

| | | | | |
|---|---|---|---|---|
| 6,856,324 B2* | 2/2005 | Sauer | ............ | G06T 19/003 345/633 |
| 7,050,078 B2* | 5/2006 | Dempski | ........... | G01S 3/7864 345/7 |
| 7,658,327 B2* | 2/2010 | Tuchman | ........... | G06Q 30/02 235/375 |
| 8,219,689 B2* | 7/2012 | Kumar | ............ | G06Q 20/102 705/38 |
| 8,370,207 B2* | 2/2013 | Edwards | ......... | G06Q 30/0201 705/26.1 |
| 9,128,520 B2* | 9/2015 | Geisner | ........... | G06F 3/011 |
| 2012/0233003 A1* | 9/2012 | Calman | ........... | G06Q 30/06 705/16 |
| 2013/0030879 A1* | 1/2013 | Munjal | ........... | G06Q 30/0224 705/7.42 |
| 2014/0207615 A1* | 7/2014 | Li | ............. | G06Q 30/0623 705/26.61 |

OTHER PUBLICATIONS

Anonymous, "Product Finder in a Retail Location," IP.com No. IPCOM000205146D; Mar. 16, 2011.*

* cited by examiner

*Primary Examiner* — Adam Levine
(74) *Attorney, Agent, or Firm* — Howard & Howard Attorneys PLLC (57) ABSTRACT

A computer-implemented method is disclosed herein. The method includes the step of providing, with a processing device of a commerce server, sales assistance to a consumer shopping in a retail store and considering a first item for purchase. The method also includes the step of receiving, at the processing device, a receipt signal containing a list of items purchased by the consumer. The method also includes the step of determining, with the processing device, if the first item is among the list of items purchased by the consumer to track the effectiveness of the providing step.

14 Claims, 7 Drawing Sheets

TRACKING EFFECTIVENESS OF REMOTE SALES ASSISTANCE USING AUGMENTED REALITY DEVICE

BACKGROUND INFORMATION

Field of the Disclosure

The present invention relates generally to assisting a consumer in reaching a decision to purchase an item. In particular, a consumer can be linked with a sales assistant that is located remotely from the consumer and the outcome of the interaction can be recorded.

Background

Some retail stores extend across tens of thousands of square feet and offer thousands of items for sale. Many consumers visit such retail stores when shopping for a diverse set of items such as groceries, office supplies, and household wares. Typically, these stores can have dozens of aisles and/or departments. It can be challenging to find a store employee to assist with a purchasing decision. A consumer can become frustrated when time must be spent looking for help. Further, if a large number of different items are offered for sale at the retail store, it is possible that when an employee is found that employee may not be knowledgeable about the particular item of interest to the consumer. A consumer may become frustrated by this chain of events and might pursue purchasing the item at another retail store.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist consumers that are shopping in a retail store. An embodiment of the present disclosure can assist a consumer by providing sales assistance promptly so that the consumer can exercise a purchasing decision without the stress that can be associated with finding a knowledgeable sales assistant. An embodiment of the present disclosure can help reduce the time and stress that can arise while shopping and thus make the shopping trip a more enjoyable and satisfying experience.

Embodiments of the present disclosure can also track the outcome of interactions between consumers and sales assistants. Data associated with an interaction in which a consumer is assisted by a sales assistant can be stored in a database. The data can include the item(s) that were the subject of sales assistance. When the consumer makes a purchase, the items purchased by the consumer can be compared to the item(s) that were the subject of the sales assistance. If an item that was the subject of sales assistance is among the items purchased by the consumer, a system according to some embodiments of the present disclosure can update one or databases so that the outcome of the interaction between the consumer and the sales assistant can be tracked. Databases that can be updated include, for example, a database that maintains information about consumers, a database that maintains information about sales assistants, and the database that maintains data associated with interactions between consumers and sales assistants.

A consumer assistance system according to some embodiments of the present disclosure can be operable to receive a help request signal from an augmented reality device worn by a consumer shopping in a retail store. A help request signal can contain data indicative of a consumer's desire for sales assistance. The consumer may be deciding between competing brands of a particular item for purchase. Alternatively, the consumer may be deciding between items that are distinct but share some common functional capability, such as an e-reader and a tablet computer. An augmented reality device worn by the consumer can be configured to receive and transmit video data, audio data, and other types of data.

The augmented reality device can be uniquely identifiable and associated with a particular consumer. Data associated with the consumer can be stored in a consumer database maintained by a consumer assistance system according to some embodiments of the present disclosure. Data associated with a consumer that is stored in a consumer database can include interactions with sales assistants.

A consumer assistance system according to some embodiments of the present disclosure can be operable to link the consumer with sales assistance in response to receiving the help request signal. For example, the augmented reality device worn by the consumer can be placed in communication with an electronic computing device operated by a sales assistant. The operator of the electronic computing device is operable to assist the consumer in making a purchasing decision. In some embodiments, a purchasing decision may not always result in a purchase. The sales assistant can be an employee of the retail store, an employee of the manufacturer of an item of interest to the consumer, or can be anyone having knowledge of the item of interest to the consumer. In some embodiments of the present disclosure, a consumer assistance system can include a database of the sales assistants that are utilized to assist consumers. An electronic computing device operated by the sales assistant can be configured to receive and transmit video data, audio data, textual data, and other types of data.

The electronic computing device and the sales assistant operating the electronic computing device can be physically remote from the augmented reality device and/or from the retail store. The sales assistant operating the electronic computing device can assist consumers shopping in a first retail store and also assist consumers shopping in a second retail store, where the first and second retail stores are at different geographic locations. An electronic computing device operated by the sales assistant can be a laptop computer, a desktop computer, a smart-phone, a tablet, an e-reader, or any other electronic computing device operable to receive and transmit video and audio data.

A consumer assistance system according to some embodiments of the present disclosure can be operable to track the results of consumer interactions with sales assistants. A consumer assistance system can be operable to receive consumer purchasing data and compare that data to data associated with sales help interactions. For example, receipt signals can be received from checkout registers. A receipt signal can contain a listing of items purchased by a consumer. The list of items purchased by the consumer can be compared with data associated with any sales help interaction. If sales assistance was provided for an item that was subsequently purchased by the consumer, a consumer assistance system according to some embodiments of the present disclosure can update any relevant databases so that the relative success of sales assistance can be tracked.

Embodiments of the present disclosure provide numerous benefits to consumers. For example, a consumer is not required to search through the retail store for an employee to assist in a purchasing decision. Assistance can be provided at the location of the consumer within the retail store. Further, the consumer is not at risk of wasting effort, such as when an employee of the retail store, when found, does not possess the knowledge needed to assist the consumer. Embodiments of the present disclosure can allow a consumer to obtain prompt assistance from a sales assistant having knowledge or ready-access to knowledge that will be useful to the consumer.

Embodiments of the present disclosure can also provide numerous benefits to retailers and manufacturers. For example, linking data associated with sales assistance with data associated with purchases can be indicative of the quality of sales assistance being provided by a retailer. Further, manufacturers can assist retailers in developing training for sales assistants if it appears, from the data generated by a consumer assistance system, that sales assistants are having difficulty communicating information about a particular product. Employers can also enjoy benefits from embodiments of the invention disclosure in that sales assistants can work from home or from a geographical area having a lower cost of living. Further, sales assistant positions can grant flexible hours and cost less than having onsite staff.

Sales assistants can benefit from systems according to embodiments of the present disclosure. When it can be stored in a database that the advice of a sales assistant closed the loop, from the consideration of an item to the purchase of that item by a consumer, the sales assistant can enjoy a commission, a performance bonus, a quota, or receive some other form of enhanced remuneration.

Figure 1:
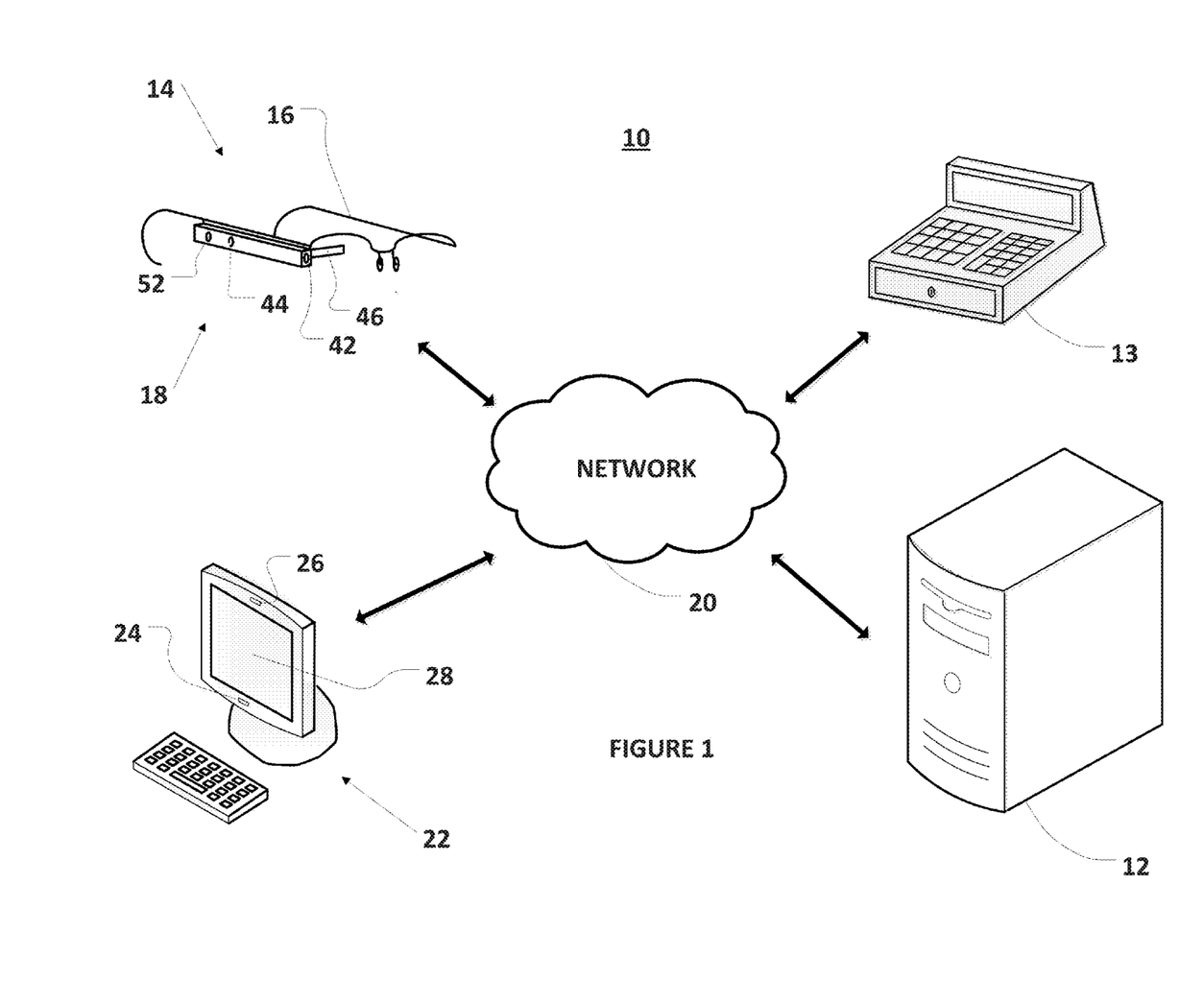
FIG. 1 is an example schematic illustrating a system according to some embodiments of the present disclosure.

FIG. 1 is a schematic illustrating a consumer assistance system 10 according to some embodiments of the present disclosure. The consumer assistance system 10 can execute a computer-implemented method that includes the step of receiving, with a commerce server 12, a help request signal from an augmented reality device worn by a consumer shopping in a retail store. The help request can be an audio signal, a video signal or can contain both audio and video data.

The help request signal can be communicated to the commerce server 12 with an augmented reality device such as a head mountable unit 14. The head mountable unit 14 can be worn by a consumer while the consumer is shopping within the retail store. In the illustrated embodiment of FIG. 1, the exemplary head mountable unit 14 includes a frame 16 and a communications unit 18 supported on the frame 16.

Signals transmitted by the head mountable unit 14 and received by the commerce server 12, and vice-versa, can be communicated over a network 20. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The commerce server 12 can determine that the help request signal contains data indicative of a request for sales assistance. For example, the signal can be an audio signal containing the consumer's voice stating a request for help. In response to receiving the help request signal, the commerce server 12 can link the head mountable unit 14 worn by the consumer with an electronic computing device 22 that is physically remote from the head mountable unit 14. The commerce server 12 can link the head mountable unit 14 and the electronic computing device 22 to permit communication between the consumer and a sales assistant operating the electronic computing device 22. In some embodiments of the present disclosure, the electronic computing device 22 can be located in the same retail store with the consumer. In some embodiments of the present disclosure, the electronic computing device 22 can be remote from the retail store occupied by the consumer.

The operator of the electronic computing device 22 is a sales assistant operable to assist the consumer. For example, the consumer can verbally state questions about various items that are being considered for purchase. The statements of the consumer can be captured by a microphone 44 of the head mountable unit 14 and transmitted by the head mountable unit 14 to the commerce server 12. The initial signal can be denoted as a help request signal and subsequent signals originating from the consumer during the interaction with the sales assistant can be denoted as consumer communication signals.

The commerce server 12 can receive the help request signal and one or more subsequent consumer communication signals from the consumer. The commerce server 12 can transmit the help request and consumer communication signals to the sales assistant operating the electronic computing device 22. The verbal statements of the consumer can be emitted through a speaker 24 of the electronic computing device 22, allowing the sales assistant to hear the consumer's statements.

The sale assistant can verbally respond to the consumer's statements. The statements of the sales assistant can be captured by a microphone 26 of the electronic computing device 22 and transmitted by the electronic computing device 22 as one or more help response signals to the commerce server 12. Help response signals provide sales assistance to the consumer. The commerce server 12 can receive the help response signals from the sales assistant and transmit the help response signals to the consumer wearing the head mountable unit 14. The verbal statements of the sales assistant can be emitted through a speaker 52 of the head mountable unit 14, allowing the consumer to hear the sales assistant's statements.

The sales assistant can also receive video signals corresponding to the consumer's field of view, so that the sales assistant can see what the consumer is seeing. The field of view of the consumer can be captured by a camera 42 of the head mountable unit 14 and transmitted by the head mountable unit 14 as a consumer communication signal to the commerce server 12. The commerce server 12 can receive a consumer communication signal containing video data from the consumer and transmit the consumer communication signal to the sales assistant operating the electronic computing device 22. The video feed corresponding to the consumer's field of view can be displayed on a display 28 of the electronic computing device 22, allowing the sales assistant to see what the consumer is seeing. The sales assistant can use the video feed to direct the consumer's gaze or hands to a particular location to better assist the consumer.

The exchange of video and audio information can facilitate the consumer's selection and purchase of an item from the retail store. In addition, the sales assistant can transmit textual data and information to the consumer with the electronic computing device 22. For example, the sales assistant can transmit item specifications to the consumer. The consumer can view the item specifications on a display 46 of the head mountable unit 14.

The consumer assistance system 10 according to some embodiments of the present disclosure can also include a device for processing purchases of consumers. For example, the consumer assistance system 10 can include a checkout register 13. The checkout register 13 can tabulate items purchased by consumers. The checkout register 13 can also transmit receipt signals to the commerce server 12 over the network 20. A receipt signal can contain a list of items purchased by a consumer.

The receipt signal can also contain data that associates the list of items with a particular consumer. The particular consumer can be linked with a list of purchased items by a cashier operating the checkout register 13. The cashier can input data identifying the consumer. Alternatively, the consumer can present a "frequent shopper" card. Alternatively, the consumer can be identified through facial recognition as set forth in a co-pending application of the inventor.

Figure 2:
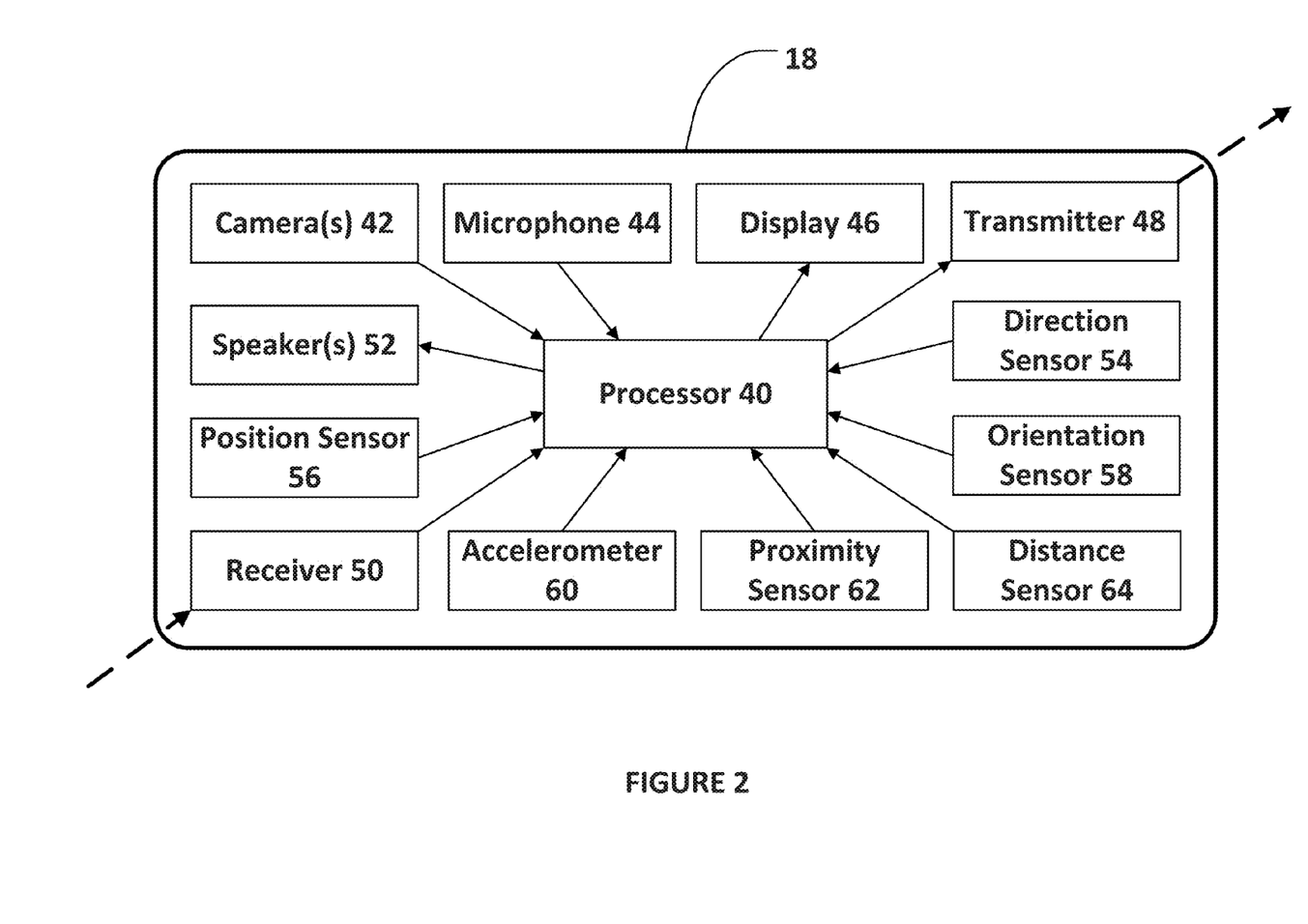
FIG. 2 is an example block diagram illustrating an augmented reality device unit that can be applied in some embodiments of the present disclosure.

FIG. 2 is a block diagram illustrating exemplary components of the communications unit 18 of the head mountable unit 14. The communications unit 18 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 18. The processor 40 can also be operable to control the other components of the communications unit 18. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, cameras 42 may be a plurality of forward-facing cameras 42. The cameras 42 can be a stereo camera with two or more lenses with a separate image sensor or film frame for each lens. This arrangement allows the camera to simulate human binocular vision and thus capture three-dimensional images. This process is known as stereo photography. The cameras 42 can be configured to execute computer stereo vision in which three-dimensional information is extracted from digital images. In such embodiments, the orientation of the cameras 42 can be known and the respective video signals can be processed to triangulate an object with both video signals. This processing can be applied to determine the distance that the consumer is spaced from the object. Determining the distance that the consumer is spaced from the object can be executed by the processor 40 or by the commerce server 12 using known distance calculation techniques.

Processing of the one or more, forward-facing video signals can also be applied to determine the identity of the object. Determining the identity of the object, such as the identity of an item in the retail store, can be executed by the processor 40 or by the commerce server 12. If the processing is executed by the commerce server 12, the processor 40 can modify the video signals limit the transmission of data back to the commerce server 12. For example, the video signal can be parsed and one or more image files can be transmitted to the commerce server 12 instead of a live video feed. Further, the video can be modified from color to black and white to further reduce transmission load and/or ease the burden of processing for either the processor 40 or the commerce server 12. Also, the video can cropped to an area of interest to reduce the transmission of data to the commerce server 12.

In some embodiments of the present disclosure, the cameras 42 can include one or more inwardly-facing camera 42 directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 44 can be configured to generate an audio signal that corresponds to sound generated by and/or proximate to the consumer. The audio signal can be processed by the processor 40 or by the commerce server 12. For example, verbal signals can be processed by the commerce server 12 such as "this item appears interesting." Such audio signals can be correlated to the video recording.

The display 46 can be positioned within the consumer's field of view. Video content can be shown to the consumer with the display 46. The display 52 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 18 from the head mountable unit 14. The processor 40 can direct signals generated by components of the communications unit 18 to the commerce sever 12 through the transmitter 48. The transmitter 48 can be an electrical communication element within the processor 40. In one example, the processor 40 is operable to direct the video and audio signals to the transmitter 40 and the transmitter 48 is operable to transmit the video signal and/or audio signal from the head mountable unit 14, such as to the commerce server 12 through the network 20.

The receiver 50 can be configured to receive signals and direct signals that are received to the processor 40 for further processing. The receiver 50 can be operable to receive transmissions from the network 20 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® standards for exchanging data over short distances by using short-wavelength radio transmissions, and thus creating personal area network (PAN). The transmitter 48 and receiver 50 can also apply 3G or 4G, which is defined by the International Mobile Telecommunications-2000 (IMT-2000) specifications promulgated by the International Telecommunication Union.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the commerce server 12 can be played for the consumer through the speaker 52. The receiver 50 can receive the audio signal from the commerce server 12 and direct the audio signal to the processor 40. The processor 40 can then control the speaker 52 to emit the audio content.

The direction sensor 54 can be configured to generate a direction signal that is indicative of the direction that the consumer is facing. The direction signal can be processed by the processor 40 or by the commerce server 12. For example, the direction sensor 54 can electrically communicate the direction signal containing direction data to the processor 40 and the processor 40 can control the transmitter 48 to transmit the direction signal to the commerce server 12 through the network 20. By way of example and not limitation, the direction signal can be useful in determining the identity of an item(s) visible in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the commerce server 12 through the network 20.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in determining one or more items that are proximate to the consumer and are visible in the video signal. The commerce server 12 can receive position data and identify the location of the consumer in some embodiments of the present disclosure.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more items for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the commerce server 12 can process the acceleration signal to derive the velocity and acceleration of the consumer in the retail store.

The proximity sensor 62 can be operable to detect the presence of nearby objects without any physical contact. The proximity sensor 62 can apply an electromagnetic field or a beam of electromagnetic radiation such infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting an item.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is facing. The distance signal can be useful in determining the distance to an object in the video signal generated by one of the cameras 42, which can be useful in determining the consumer's location in the retail store.

Figure 3:
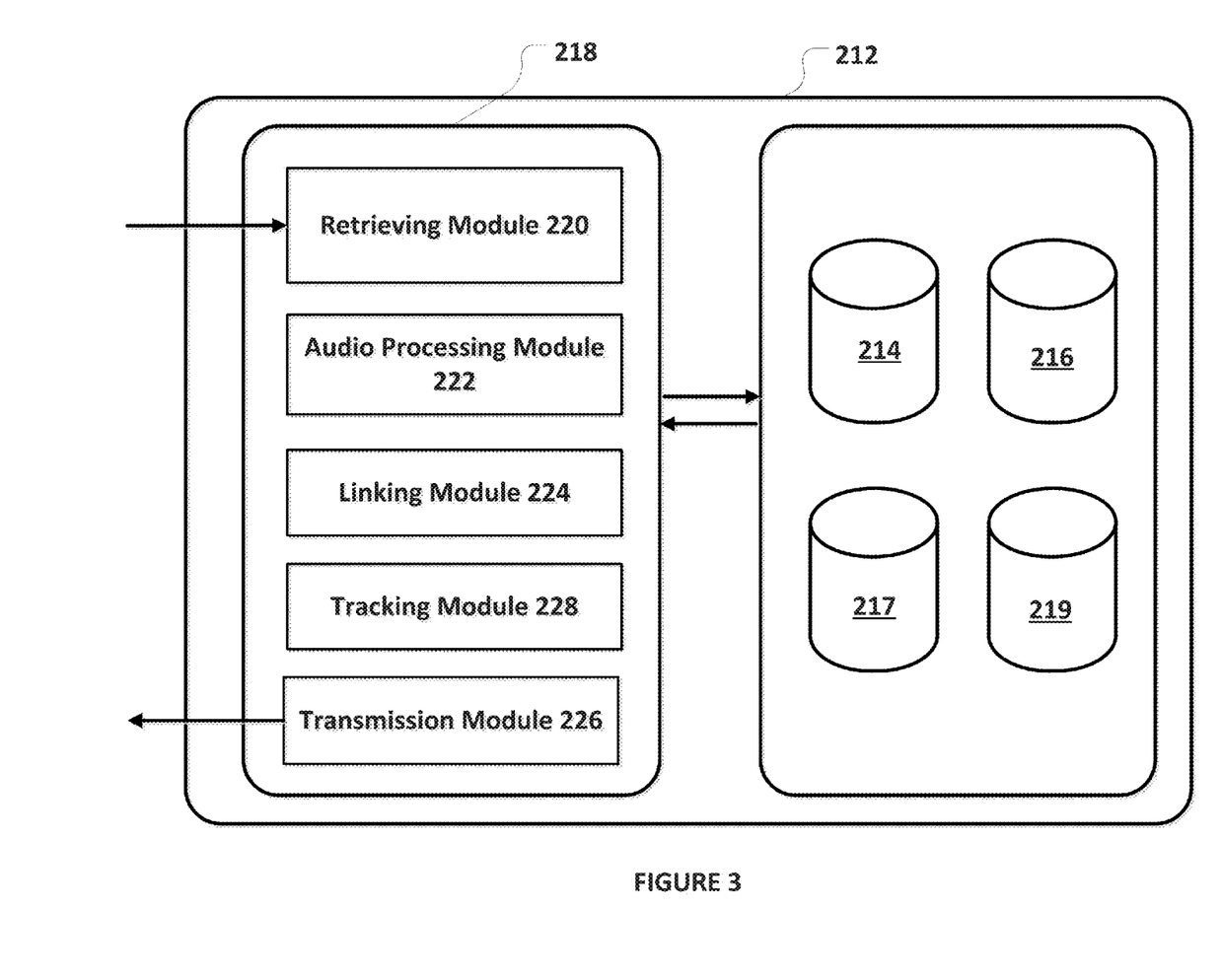
FIG. 3 is an example block diagram illustration of a commerce server that can be applied in some embodiments of the present disclosure.

FIG. 3 is a block diagram illustrating a commerce server 212 according to some embodiments of the present disclosure. In the illustrated embodiment, the commerce server 212 can include an item database 214, a sales help interaction database 216, a consumer database 217, and a sales assistant database 219. The commerce server 212 can also include a processing device 218 configured to include a receiving module 220, an audio processing module 222, a linking module 224, a transmission module 226, and a tracking module 228.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The item database 214 can include in memory the identities of a plurality of items. The plurality of items can be the items offered for sale in one or more retail stores associated with the commerce server 212. The item database 214 can also contain specifications for at least some of the items. The item database 214 can also contain consumer reviews of at least some of the items. The item database 214 can also contain a floor plan of the one or more retail stores, including the location of each of the plurality of items within each retail store. The data in the item database 214 can be organized based on one or more tables that may utilize one or more algorithms and/or indexes.

The sales help interaction database 216 can include memory containing data associated with interactions between consumers and a sales assistants. The data associated with a particular interaction between a consumer and a sales assistant can include audio data, video data, textual data, or other forms of data. For example, verbal conversations between the consumer and sales assistance can be stored as data associated with a particular interaction in the sales help interaction database 216. A video signal that is generated by an augmented reality device worn by the consumer during the interaction can also be stored as data associated with a particular interaction in the sales help interaction database 216. The identities of products that were the subject of the assistance can also be stored as data associated with a particular interaction in the sales help interaction database 216. The identity of the consumer who requested assistance can also be stored as data associated with a particular interaction in the sales help interaction database 216. The identity of the sales assistant who assisted the consumer can also be stored as data associated with a particular interaction in the sales help interaction database 216. The data in the sale help interaction database 216 can be organized based on one or more tables that may utilize one or more algorithms and/or indexes.

The consumer database 217 can include in memory the identities of a plurality of consumers. The plurality of consumers can be the consumers who have purchased items in one or more retail stores that are associated with the commerce server 212. The consumer database 217 can contain the purchase histories of each consumer. The consumer database 217 can also contain demographics of each consumer, such as age, gender, and contact information, including physical and email address. The consumer database 217 can also contain item reviews offered by each consumer. The data in the consumer database 217 can be organized based on one or more tables that may utilize one or more algorithms and/or indexes.

The sales assistant database 219 can include in memory the identities of a plurality of sales assistants. Sales assistants can be employees of the retail store, employees of manufacturers, or third-party contractors. The plurality of sales assistants can each provide help to consumers in making purchasing decisions in one or more retail stores that are associated with the commerce server 212. The sales assistant database 219 can contain a record of all interactions each sales assistant has had with consumers. For example, the sales assistant database 219 can contain data indicating the items that the sales assistant has assisted consumers in evaluating. The sales assistant database 219 can also contain data indicating the value of the items that the sales assistant has assisted consumers in evaluating. The sales assistant database 219 can also contain data indicating the demographics of consumers that the sales assistant has helped. The data in the sales assistant database 219 can be organized based on one or more tables that may utilize one or more algorithms and/or indexes.

The processing device 218 can communicate with the databases 214, 216. 217, 219 and receive one or more signals from the head mountable unit 14 and from the electronic computing device 22. The processing device 218 can include computer readable memory storing computer readable instructions and one or more processors executing the computer readable instructions.

The receiving module 220 can be operable to receive signals over the network 20, assess the signals, and communicate the signals or the data contained in the signals to other components of the commerce server 212. The receiving module 220 can be configured to receive help request signals and consumer communication signals from one or more consumers wearing respective augmented reality devices. The receiving module 220 can also be configured to receive one or more sales assistance or help response signals from one or more sales assistants operating respective electronic computing devices. The receiving module 220 can also be configured to receive one or more receipt signals from devices such as checkout registers 13.

The receiving module 220 can receive a signal containing audio data such as the voice of a consumer. A signal containing audio data can be directed to the audio processing module 222 for further processing. Speech by a consumer can be captured by the microphone 44 and transmitted to the commerce server 212 by the head mountable unit 14. The voice of the consumer can be continuously monitored as the consumer shops in some embodiments of the present disclosure.

The audio processing module 222 can analyze the audio data contained in a consumer signal, such as verbal statements made by a consumer. The audio processing module 222 can implement known speech recognition techniques to identify speech in an audio signal. The consumer's speech can be encoded into a compact digital form that preserves its information. The encoding can occur at the head mountable unit 14 or at the commerce server 212. The audio processing module 222 can be loaded with a series of models honed to comprehend language. When encoded locally, the speech can be evaluated locally, on the head mountable unit 14. A recognizer installed on the head mountable unit 14 can communicate with the commerce server 212 to gauge whether the voice contains a command can be best handled locally or if the commerce server is better suited to execute the command. The audio processing module 222 can compare the consumer's speech against a statistical model to estimate, based on the sounds spoken and the order in which the sounds were spoken, what letters might be contained in the speech. At the same time, the local recognizer can compare the speech to an abridged version of that statistical model applied by the audio processing module 222. For both the commerce server 212 and the head mountable unit 14, the highest-probability estimates are accepted as the letters contained in the consumer's speech. Based on these estimations, the consumer's speech, now embodied as a series of vowels and consonants, is then run through a language model, which estimates the words of the speech. Given a sufficient level of confidence, the audio processing module 222 can then create a candidate list of interpretations for what the sequence of words in your speech might mean. If there is enough confidence in this result, the audio processing module 222 can determine the consumer's intent.

In a first example, a consumer can state "I would like assistance" in an embodiment of the present disclosure. This statement can be contained in a signal received by the commerce server 212. The signal can be processed and the statement can be recognized by the audio processing module 222. In response, the audio processing module 222 can communicate the indication that sales assistance is requested to the linking module 224 for further processing, as will be set forth in greater detail below. Thus, the signal containing the consumer's voice expressing a request for assistance can define a help request signal.

The linking module 224 can be configured to act on help requests contained in signals received from consumers. In response to the detection of a help request by the audio processing module 222, the linking module 224 can direct the transmission module 226 to transmit a signal to the electronic computing device 22. The initial signal transmitted to the electronic computing device 22 can contain the help request signal itself, such the voice of the consumer. In some embodiments of the present disclosure, the initial signal transmitted to the electronic computing device 22 can also contain the identity of the consumer (based on the identity of the head mountable unit 14), the location of the retail store occupied consumer, and/or some other data that may be useful in assisting the consumer. Subsequent consumer communication signals can also be directed to the electronic computing device 22.

The electronic computing device 22 can respond to the initial help request signal from the commerce server 212 and subsequent consumer communication signals by transmitting one or more help response signals back to the commerce server. The receiving module 220 can be configured to direct help response signals to the linking module 224, bypassing the audio processing module 222. The linking module 224 can direct the transmission module 226 to transmit help response signals to the head mountable unit 14. Thus, the linking module 224 can facilitate continuous and real time communication between the consumer and the sales assistant.

After receiving an initial help request signal from the consumer, the linking module 224 can direct the receiving module 222 to direct audio and video signals received from the head mountable unit 14 directly to the linking module 224 and bypass the audio processing module 222. The linking module 224 can then direct the transmission module 226 to transmit these signals, consumer communication signals, to the electronic computing device 22.

The linking module 224 can also be configured to direct data associated with the interaction between the consumer and the sales assistant to the sales help interaction database 216 for storage. In response to the detection of a help request by the audio processing module 222, the linking module 224 can access the sales help interaction database 216 and establish an entry for the current interaction. Subsequent signals that are received from either the consumer or the sales assistant can be transmitted to the other party and also stored in the sales help interaction database 216. Thus, the sales help interaction database 216 can contain a record of each consumer-sales assistant interaction. Each record or entry in the sales help interaction database 216 can include data identifying the consumer, the sales assistant, the date and time of the interaction, the items that were the subject of the interaction, and/or the location of the retail store occupied by the consumer in some embodiments of the present disclosure.

After a sales help interaction has ended, the sales assistant can control the electronic computing device 22 to transmit a termination signal to the commerce server 212. The termination signal can contain data directing the linking module 224 to terminate the link. The linking module 224 can direct the receiving module 220 to again direct audio signals from the head mountable unit 14 to the audio processing module 222.

The receiving module 220 can direct receipt signals to the tracking module 228. As set forth above, a receipt signal can contain a list of items purchased by a consumer and data indicative of the identity of the consumer. In response to the receipt signal, the tracking module 228 can access the sales help interaction database 216. The tracking module 228 can search for entries in the sales help interaction database 216 for interactions associated with the consumer of the list of items contained in the receipt signal.

If an entry is found in the sales help interaction database 216 for the consumer of interest, the tracking module 228 can update the data in the sales help interaction database 216. For example, the tracking module 228 can update the entry of the interaction to include data indicating that the consumer purchased the item that was the subject of sales assistance. As a result, the data in the sales help interaction database 216 can be a comprehensive record of sales assistance activities.

If an entry is found in the sales help interaction database 216 for the consumer of interest, the tracking module 228 can also update the data in the consumer database 217. For example, the tracking module 228 can update the entry for the consumer that the consumer was successfully helped in making a purchasing decision. The consumer's entry in the consumer database 217 can also be updated to include the item purchased, the price of the item, and the identity of the sales assistant that assisted the consumer.

If an entry is found in the sales help interaction database 216 for the consumer of interest, the tracking module 228 can also update the data in the sales assistant database 219. For example, the tracking module 228 can update the entry for the sales assistant that successfully helped the consumer in making a purchasing decision. The sales assistant's entry in the sales assistant database 217 can also be updated to include the item purchased, the price of the item, and the demographics of the consumer that was assisted.

It is noted that the various processing functions set forth above can be executed differently than described above in order to enhance the efficiency of an embodiment of the present disclosure in a particular operating environment. The processor 40 can assume a greater role in processing some of the signals in some embodiments of the present disclosure. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 4A:
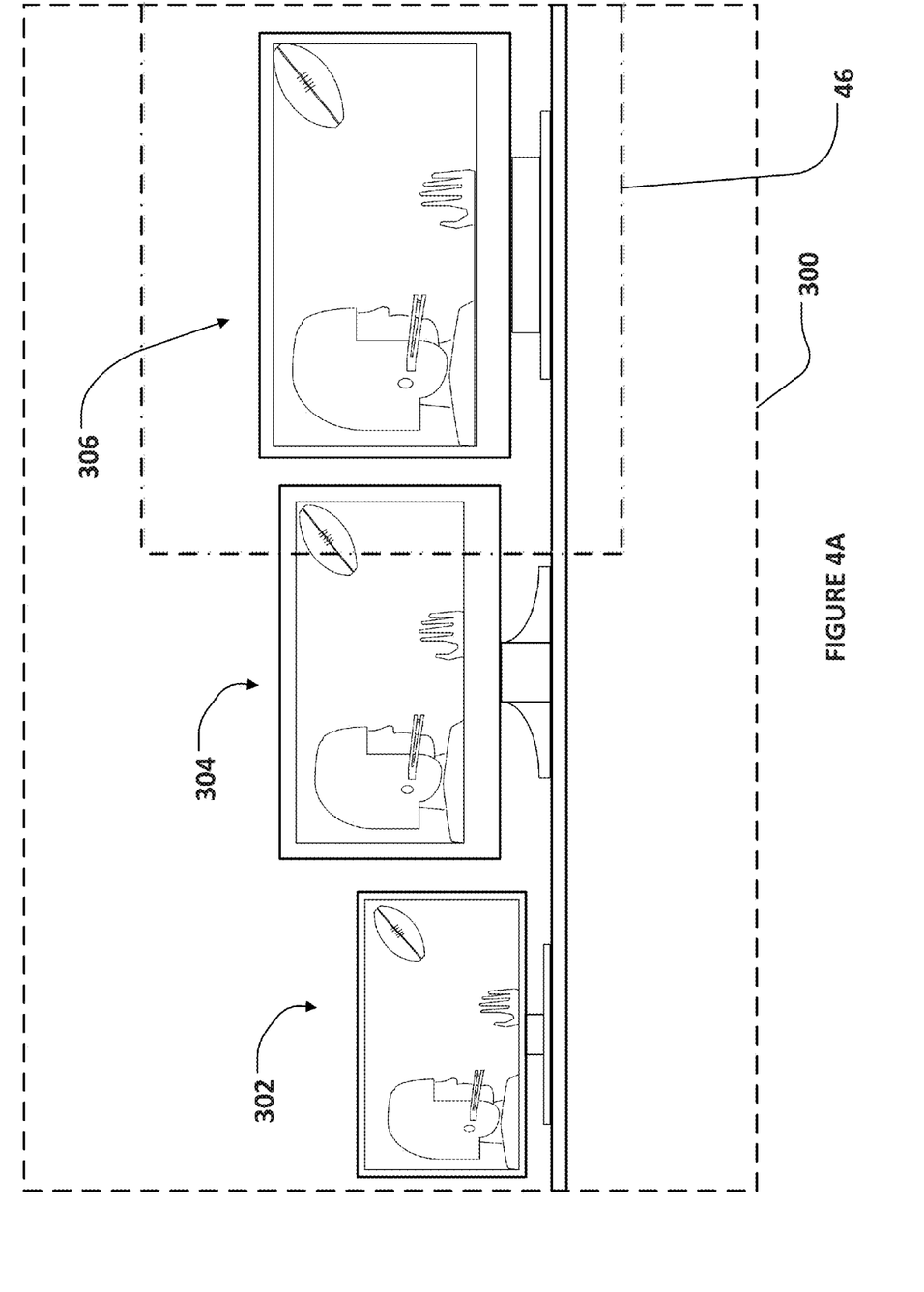
FIG. 4A is a first exemplary field of view of a consumer while shopping in some embodiments of the present disclosure.

FIG. 4A is a first exemplary field of view of a consumer while shopping in some embodiments of the present disclosure. This field of view can be captured by a camera 42 of a head mountable unit 14 worn by the consumer and transmitted as a video signal to the commerce server 212 in some embodiments of the present disclosure. The consumer's field of view is bounded in this example by the box referenced at 300. A portion of the consumer's field of view can be overlapped by the display 46 of an augmented reality device such as the head mountable unit 14. In FIG. 4A, the display 46 is not engaged and can therefore be substantially transparent. The boundary of the display 46 is illustrated by dashed lines and not solid lines to enhance the clarity of the other elements of FIG. 4A.

The consumer can be viewing a store shelving structure supporting items 302, 304, and 306. Items 302, 304, 306 can be competing brands of a particular kind of product. The exemplary items 302, 304, 306 can be competing brands of televisions. The consumer can be considering which of the items 302, 304, 306 to purchase. In some embodiments of the present disclosure, the consumer can initiate sales assistance with the augmented reality device, such as by stating "please help me with these items." The statement can be contained in an audio signal transmitted to the commerce server 212 by the head mountable unit 14. The commerce server 212 can detect the speech in the audio signal and recognize the signal as a help request signal. In response to the request for sales assistance, the commerce server 212 can establish a link between the consumer and the sale assistant by establishing link between the head mountable unit 14 and the electronic computing device 22.

Figure 4B:
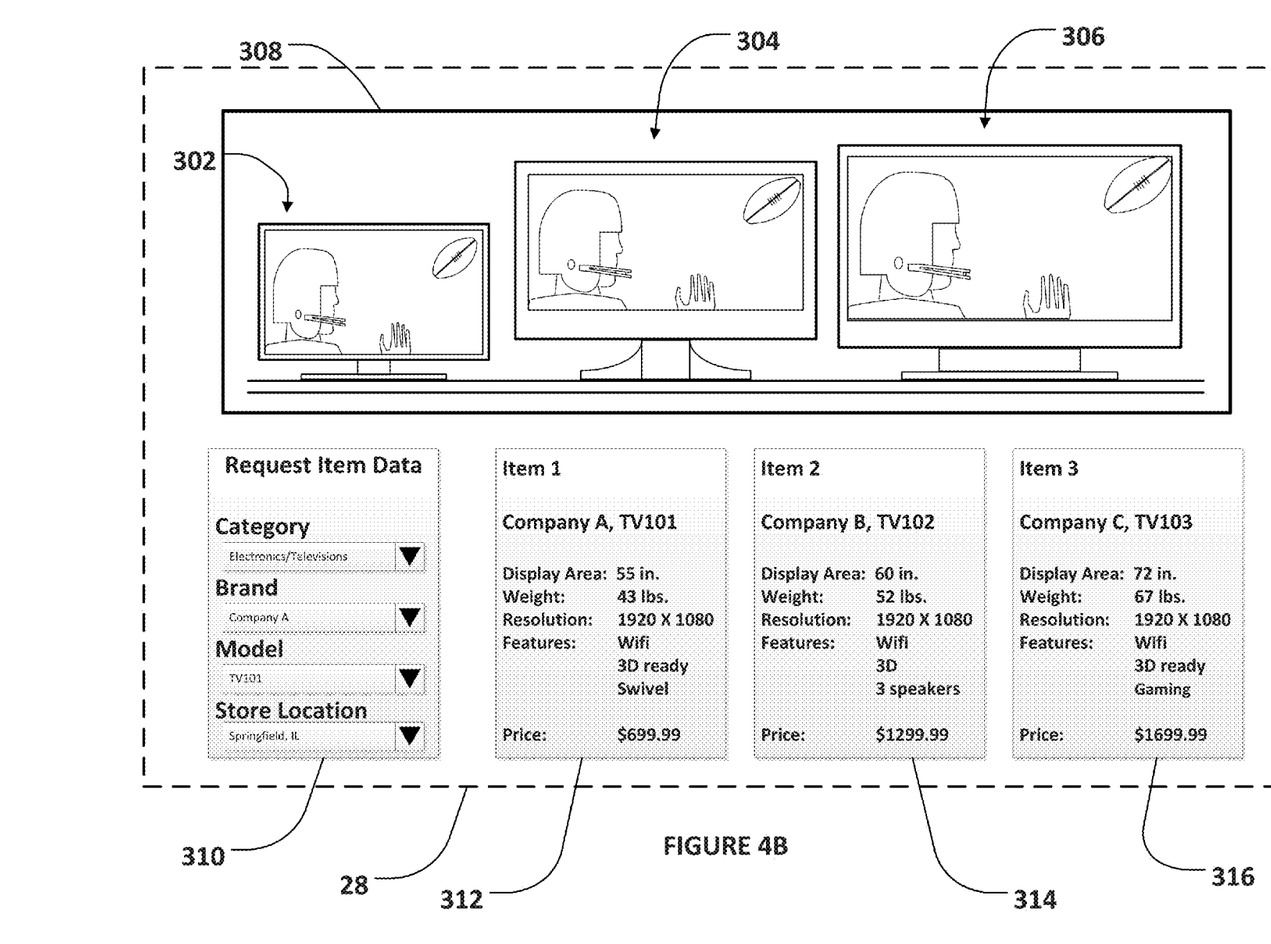
FIG. 4B is an exemplary display of an electronic computing device operated by a sales assistant in some embodiments of the present disclosure.

FIG. 4B is an exemplary display 28 of the electronic computing device 22 in some embodiments of the present disclosure. The sales assistant has been engaged to assist the consumer whose field of view is shown in FIG 4A. The commerce server 212 can direct a video signal generated by the camera 42 of the head mountable unit 14 that is being worn by the consumer to the electronic computing device 22. The exemplary video signal contains visual data shown in FIG. 4A. The electronic computing device 22 can display the images contained in the video signal on the display 28. In FIG. 4B, the live video is displayed on a portion of the display 28 referenced at 308. Thus, the sales assistant can see what the consumer is seeing.

The identities of the items 302, 304, 306 can be communicated to the sales assistant verbally, such in an audio signal from the consumer. Alternatively, the sales assistant can identify the items 302, 304, 306 from the images in the video signal displayed on the portion 308 of the display 28. When the items 302, 304, 306 are identified, the sales assistant can control the electronic computing device 22 to transmit a data request signal to the commerce server 212. The data request signal can contain a request for data associated with one or more of the items 302, 304, 306.

In some embodiments of the present disclosure, the electronic computing device 22 can present a nested set of pull-down menus on the display 28. In FIG. 4B, the sales assistant can define the parameters of the data request signal with a nested set of pull-down menus referenced at 310 on the display 28. The exemplary embodiment allows the sales assistant to select an item category, a brand or manufacturer of the item, a model number, and a physical location of the consumer (if the location of the consumer has not yet been established). The physical location may be relevant if pricing is different at different retail stores of a common retailer. After selecting an option from each pull down menu, the electronic computing device 22 can transmit a data request signal to the commerce server 212 containing the options selected by the sales assistant.

The data request signal can be received by the receiving module 220 and directed to the linking module 224. The linking module 224 can access the item database 214 and retrieve all or less than all of the information associated with the item defined by the options selected by the sales assistant. The linking module 224 can direct the transmission module 226 to transmit the data retrieved from the item database 214 to the electronic computing device 22.

The sales assistant can request data for more than one item and the electronic computing device 22 can concurrently display data associated with more than one item. The sales assistant can cycle through data associated with different items to assist the consumer in deciding between more than one item. In FIG. 4B, the exemplary computing device 22 can display data in dedicated portions of the display 28 for each of the items 302, 304, 306. For example, a portion of the display 28 referenced at 312 can display data associated with the item 302. A portion of the display 28 referenced at 314 can display data associated with the item 304. A portion of the display 28 referenced at 316 can display data associated with the item 306. The information visible in FIG. 4B. can be less than all of the information available to the sales assistant. In some embodiments, the sales assistant can click on one of the portions 312, 314, 316 to access more information that might be available for the respective item 302, 304, 306.

The sales assistant can receive questions from the consumer, search the data available in one or more of the portions 312, 314, 316, and provide answers to the consumer's questions. In some embodiments, the item specifications can be transmitted to the consumer. The sales assistant can control the electronic computing device 22 to transmit a help response signal to the commerce server directing the linking module 224 to transmit item specification data to the head mountable unit 14. The linking module 224 can access the item database 214, retrieve the data desired by the consumer, and direct the transmission module 226 to transmit the data to the head mountable unit 14.

Figure 4C:
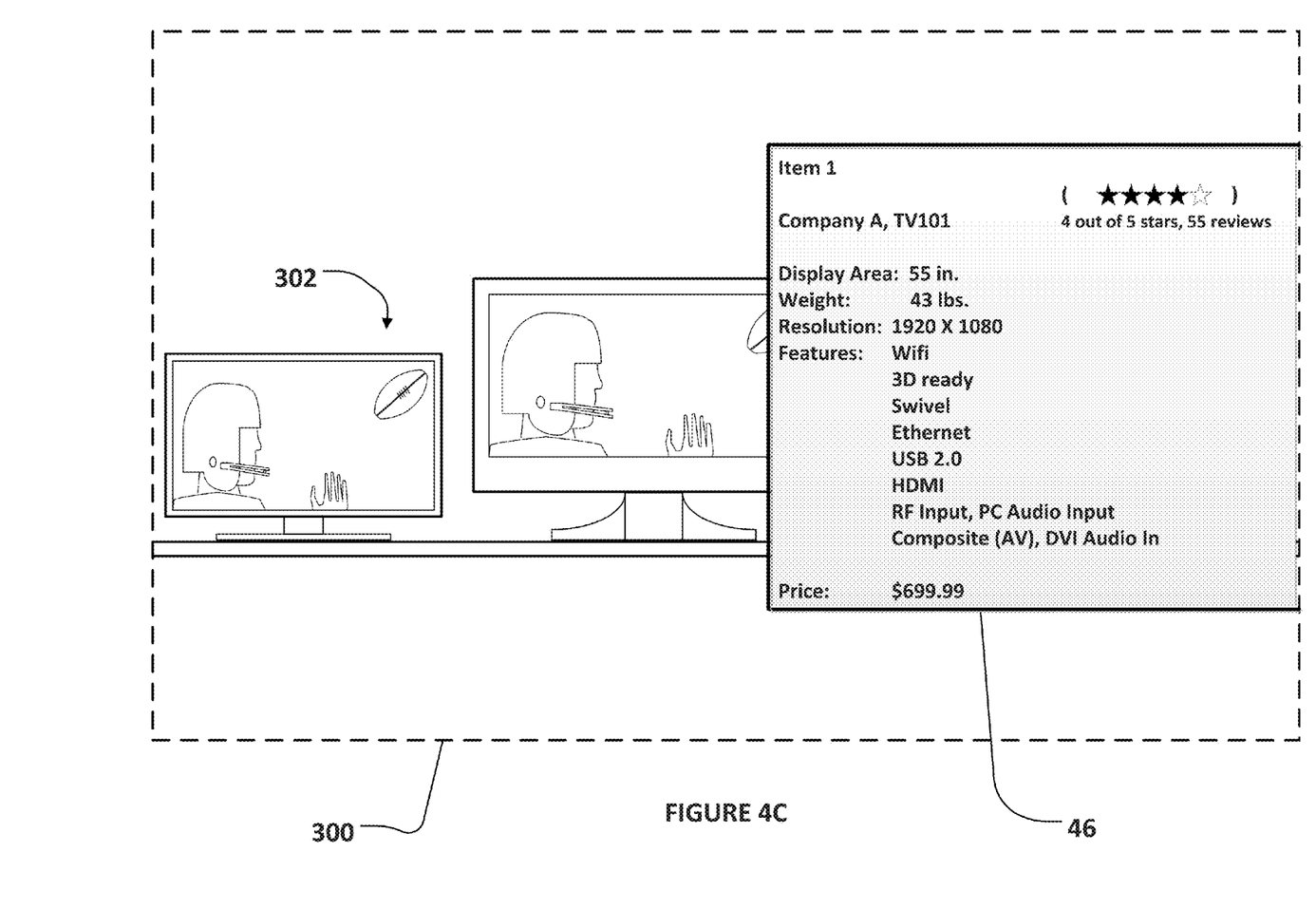
FIG. 4C is a second exemplary field of view of a consumer while shopping in some embodiments of the present disclosure.

FIG. 4C is a second exemplary field of view of a consumer while shopping in some embodiments of the present disclosure. The consumer's field of view is again bounded in this example by the box referenced at 300. A portion of the consumer's field of view is overlapped by the display 46 of the head mountable unit 14. In FIG. 4C, the display 46 is engaged. The specifications of an item being considered for purchase are being displayed by the display 46. In the exemplary embodiment, the data displayed by the display 46 includes the data displayed in the portion 312 of the display 28 in FIG. 4B. It is noted that more or less data can be displayed by the display 46 relative to the display 28. For example, the consumer can be granted access to reviews created by other consumers while this information may not be applicable to the sales assistant. The consumer can verbally request access to these reviews and the sales assistant can control the electronic computing device 22 to transmit a help response signal to the commerce server 212 directing the linking module 224 to transmit consumer review data to the head mountable unit 14. The linking module 224 can access the item database 214, retrieve the consumer review data desired by the consumer, and direct the transmission module 226 to transmit the consumer review data to the head mountable unit 14.

The consumer and sales assistant can exchange audio and video data to address questions the consumer has about one or more items being considered for purchase. The sales assistant can relatively quickly access all available data regarding the items being considered and communicate this data verbally or transmit the data so the consumer can review the data in textual format. In some embodiments, videos showing an item being assembled or in use can be transmitted to the consumer for viewing on the display 46. The consumer can be freed from the effort of searching for item data based on the efforts of the sales assistant. The consumer can then exercise a purchasing decision with confidence that information relevant to the decision has been considered.

In the example, the consumer may elect to purchase the item 302 after receiving assistance from the sales assistant operating the electronic computing device 22. The consumer can proceed to the checkout register 13 and purchase the item 302. The checkout register 13 can transmit a receipt signal over the network 20 to the commerce server 212. In response, the tracking module 228 of the commerce server 212 can access and update the databases 216, 217, 219 to reflect that the sales assistant was successful and the consumer has purchased the item 302.

Figure 5:
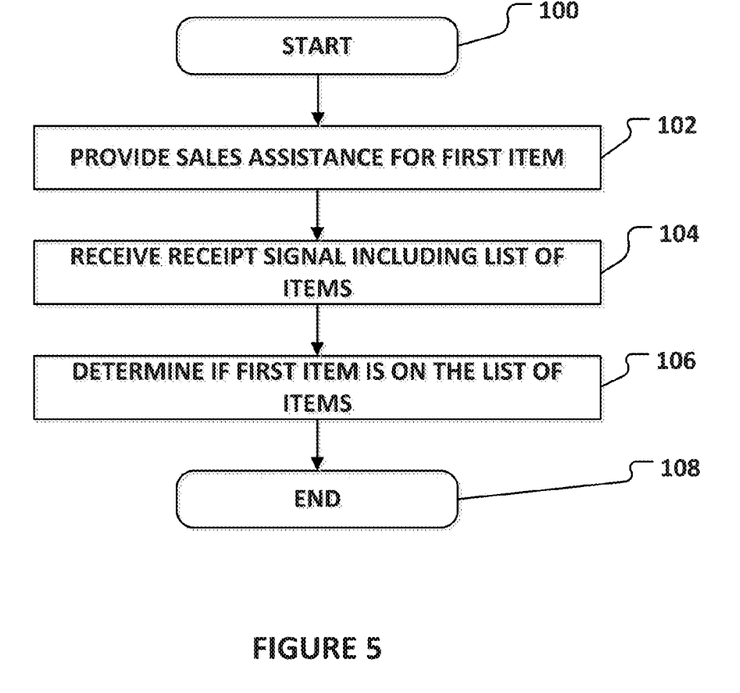
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 5 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can provide sales assistance to a consumer shopping in a retail store and considering a first item for purchase.

At step 104, the commerce server can receive a receipt signal containing a list of items purchased by the consumer. At step 106, the commerce server can determine if the first item is among the list of items purchased by the consumer to track the effectiveness of the providing step. The exemplary process ends at step 108.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
providing a commerce server associated with a retailer;
providing a database stored on the commerce server and containing data associated with a plurality of sales assistants;
providing an electronic computing device controlled by a sales assistant and physically remote from an augmented reality device worn by a consumer shopping in a retail store, the electronic computing device communicatively coupled to the augmented reality device and the commerce server;
receiving, with a processing device of the commerce server, a help request signal from the augmented reality device;
linking, with the processing device, the augmented reality device with the electronic computing device;
receiving, with the processing device, a consumer communication signal from the augmented reality device, wherein the augmented reality device is configured to generate an interface using audio data and video data in order to initiate the real-time communication between the consumer and the sales assistant, and wherein the consumer communication signal contains the audio data and the video data comprising at least part of a field of view the consumer;
transmitting, with the processing device, the consumer communication signal to the electronic computing device;
correlating, with the processing device, the audio data and the video data to determine a location of a first item;
receiving, with the processing device, a consumer distance signal from the augmented reality device, wherein the distance signal is generated by a distance sensor of the augmented reality device using a laser;
receiving, with the processing device, a consumer position signal from the augmented reality device, wherein the position signal is generated by an ultrasonic position sensor of the augmented reality device;
determining, with the processing device and using the distance signal, the position signal, and the location of the first item, that the first item is within a predefined distance from the consumer;
providing, with the processing device, sales assistance to the consumer shopping in a retail store and considering the first item for purchase;
receiving, at the processing device, a receipt signal containing a list of items purchased by the consumer; and
determining, with the processing device, that the first item is among the list of items purchased by the consumer to track an effectiveness of providing sales assistance.

2. The computer-implemented method of claim 1, further comprising:
maintaining a database of consumers; and
updating, with the processing device, the database of consumers in response to determining that the first item is among the list of items purchased by the consumer.

3. The computer-implemented method of claim 1, wherein providing sales assistance to the consumer further comprises:
placing, with the processing device, one of a plurality of sales assistants in communication with the consumer, wherein one of a plurality of sales assistants physically remote from the consumer.

4. The computer-implemented method of claim 3, further comprising:
maintaining a database of sales assistants; and
updating, with the processing device, the database of sales assistants in response to determining that the first item is among the list of items purchased by the consumer.

5. The computer-implemented method of claim 3, further comprising:
storing data associated with an interaction between the consumer and the sale assistant in a sales help interaction database; and
updating, with the processing device, the sales help interaction database in response to determining that the first item is among the list of items purchased by the consumer.

6. The computer-implemented method of claim 1, further comprising:
receiving, with the processing device, the consumer communication signal from the augmented reality device, wherein the consumer communication signal additionally contains a voice of the consumer.

7. The computer-implemented method of claim 1, linking the augmented reality device in communication with the electronic computing device further comprises:
receiving, with the processing device, a help response signal from the electronic computing device containing audio data; and
transmitting, with the processing device, the help response signal to the augmented reality device.

8. The computer-implemented method of claim 1, linking the augmented reality device in communication with the electronic computing device further comprises:
receiving, with the processing device, a help response signal from the electronic computing device containing video data; and
transmitting, with the processing device, the help response signal to the augmented reality device.

9. The computer-implemented method of claim 1, linking the augmented reality device in communication with the electronic computing device further comprises:
receiving, with the processing device, a help response signal from the electronic computing device containing textual data; and
transmitting, with the processing device, the help response signal to the augmented reality device.

10. The computer-implemented method of claim 1, wherein providing sales assistance to the consumer further comprises providing sales assistance to the consumer with a sales assistant communicating with the consumer at least initially through the processing device; and
increasing a remuneration of the sales assistant that provided the sales assistance to the consumer in response to determining that the first item is among the list of items purchased by the consumer.

11. A computer-implemented method comprising:
providing a commerce server associated with a retailer;
providing a database stored on the commerce server and containing data associated with a plurality of operators;
providing an electronic computing device physically remote from an augmented reality device worn by a consumer shopping in a retail store, the electronic computing device communicatively coupled to the augmented reality device and the commerce server;
offering a plurality of items for sale at a plurality of retail stores of the retailer;
receiving, with a processing device of the commerce server, a help request signal from the augmented reality device worn by the consumer shopping in one of the plurality of retail stores wherein the help request is associated with a first item;
determining, with the processing device, that the help request signal contains data indicative of a request for sales assistance;
linking, with the processing device, the augmented reality device with the electronic computing device, wherein an operator of the electronic computing device is operable to assist the consumer;
receiving, with the processing device, a consumer communication signal from the augmented reality device, wherein the augmented reality device is configured to generate an interface using audio data and video data in order to initiate the real-time communication between the consumer and the sales assistant, and wherein the consumer communication signal contains the audio data and the video data comprising at least part of a field of view the consumer;
transmitting, with the processing device, the consumer communication signal to the electronic computing device;
correlating, with the processing device, the audio data and the video data to determine a location of the first item;
receiving, with the processing device, a consumer distance signal from the augmented reality device, wherein the distance signal is generated by a distance sensor of the augmented reality device using a laser;
receiving, with the processing device, a consumer position signal from the augmented reality device, wherein the position signal is generated by an ultrasonic position sensor of the augmented reality device;
determining, with the processing device and using the distance signal, the position signal, and the location of the first item, that the first item is within a predefined distance from the consumer;
receiving, at the processing device, a receipt signal containing a list of items purchased by the consumer; and
determining, with the processing device, if the first item is among the list of items purchased by the consumer.

12. The computer-implemented method of claim 11, wherein:
receiving the help request signal further comprises receiving, with a processing device of a commerce server, a first help request signal from a first augmented reality device worn by a first consumer shopping in a first of the plurality of retail stores and a second help request signal from a second augmented reality device worn by a second consumer shopping in a second of the plurality of retail stores; and
linking the augmented reality device in communication with an electronic computing device further comprises linking, with the processing device, the first and second augmented reality devices in communication with the electronic computing device physically remote from both of the first and second augmented reality devices, wherein an operator of the electronic computing device is operable to assist the first and second consumers.

13. The computer-implemented method of claim 11, wherein:
receiving the help request signal further comprises receiving, with a processing device of a commerce server, a first help request signal from a first augmented reality device worn by a first consumer shopping in a first of the plurality of retail stores and a second help request signal from a second augmented reality device worn by a second consumer shopping in a second of the plurality of retail stores; and
linking the augmented reality device in communication with an electronic computing device further comprises linking, with the processing device, the first and second augmented reality devices in communication with the electronic computing device physically remote from both of the first and second augmented reality devices and from one of the first and second of the plurality of retail stores, wherein an operator of the electronic computing device is operable to assist the first and second consumers.

14. A consumer assistance system comprising:
a commerce server of a retailer;
a database stored on the commerce server and containing data associated with a plurality of operators; and
an electronic computing device physically remote from an augmented reality device worn by a consumer shopping in a retail store, the electronic computing device communicatively coupled to the augmented reality device and the commerce server;
the commerce server having a processing device including:
a receiving module configured to receive a help request signal from the augmented reality device;
an audio processing module configured to determine that the help request signal contains data indicative of a request for sales assistance;
a linking module configured to link the augmented reality device and the electronic computing device, wherein an operator of the electronic computing device is operable to assist the consumer;
the receiving module further configured to receive a consumer communication signal from the augmented reality device, wherein the augmented reality device is configured to generate an interface using audio data and video data in order to initiate the real-time communication between the consumer and the operator, and wherein the consumer communication signal contains the audio data and the video data comprising at least part of a field of view the consumer;
a transmission module configured to transmit the consumer communication signal to the electronic computing device;
a locations module configured to correlate the audio data and the video data to determine a location of a first item;
the receiving module further configured to receive a consumer distance signal from the augmented reality device, wherein the distance signal is generated by a distance sensor of the augmented reality device using a laser;
the receiving module further configured to receive receiving a consumer position signal from the augmented reality device, wherein the position signal is generated by an ultrasonic position sensor of the augmented reality device; and the locations module further configured to determine, using the distance signal, the position signal, and the location of the first item, that the first item is within a predefined distance from the consumer.

\* \* \* \* \*